US006572949B1

(12) United States Patent
Lewis et al.

(10) Patent No.: US 6,572,949 B1
(45) Date of Patent: Jun. 3, 2003

(54) PAINT MASK AND METHOD OF USING

(76) Inventors: Carlton Paul Lewis, 1504 Old Snow Hill Rd., Kinston, NC (US) 28503; Rick Luther Webb, 3208 Daw Dr., Kinston, NC (US) 28501

( * ) Notice: Subject to any disclaimer, the term of this patent is extended or adjusted under 35 U.S.C. 154(b) by 37 days.

(21) Appl. No.: 09/682,406

(22) Filed: Aug. 30, 2001

(51) Int. Cl.[7] .............................. B32B 3/04; B32B 3/06

(52) U.S. Cl. .......................... 428/99; 428/102; 428/124; 428/900; 118/505

(58) Field of Search .......................... 428/99, 102, 124, 428/900; 118/505, 504; 280/770; 150/166

(56) References Cited

U.S. PATENT DOCUMENTS

| | | | | |
|---|---|---|---|---|
| 2,840,039 A | * | 6/1958 | Darnell et al. | 118/505 |
| 3,119,158 A | * | 1/1964 | Schornstheimer et al. | 428/124 |
| 5,198,031 A | | 3/1993 | Derstine | |
| 5,631,055 A | | 5/1997 | Vines et al. | |
| 5,702,774 A | | 12/1997 | Griffin et al. | |
| 5,776,572 A | | 7/1998 | Lipson | |
| 5,799,975 A | * | 9/1998 | Crick | 280/770 |
| 5,885,667 A | | 3/1999 | Calfat | |
| 6,248,173 B1 | | 6/2001 | Dixon | |

OTHER PUBLICATIONS

Transtech Services, Inc. www.tsservices.com/cp.htm, p. 3, Aug. 7, 2001.

Mag–Mask www.mag–mask.com/maskshld.html, pp. 1–2, Aug. 7, 2001.

* cited by examiner

*Primary Examiner*—Alexander S. Thomas
(74) *Attorney, Agent, or Firm*—John F. Bohland

(57) ABSTRACT

The present invention provides a paint masking article that is easy to apply and reusable. It is suitable for use on any ferromagnetic surface but is particularly well suited for body repair work on automobiles. The paint masking article comprises a flexible sheet of paint masking material, a flexible magnetic strip, and means for securing the magnetic strip within a folded edge of the paint masking material. Methods for making and using the paint masking articles are also provided.

14 Claims, 4 Drawing Sheets

PAINT MASK AND METHOD OF USING

BACKGROUND OF INVENTION

When surfaces are painted it is frequently necessary to mask adjacent areas to prevent undesired overspray. This is usually the case when repainting a repaired area of an automobile body. Typically, the required masking is provided by laying sheets of a suitable masking material, such as paper, on the surfaces to be protected, and securing them to the vehicle with masking tape. The masking tape and paper is used to define the perimeter of the area to be painted.

The conventional masking method using tape and paper has several disadvantages. The tape and paper are time consuming to apply. The excessive application time results in additional cost. Also, after the painting is complete, the tape and paper are removed and discarded. Discarding the materials after a single use is inefficient in the use of new materials and results in large quantities of used material that require disposal.

U.S. Pat. No. 5,631,055, incorporated herein by reference, describes a paint masking assembly that provides a sheet of flexible masking material pre-cut into a shape required to mask a particular feature on a surface to be painted. The sheet of masking material is also pre-coated with a pressure sensitive adhesive at the edges. Although this paint masking assembly reduces the time required to apply the masking material, it is a single use material having the associated problems of inefficient use and waste disposal.

U.S. Pat. No. 5,776,572, incorporated herein by reference, provides a general purpose masking material pre-coated with pressure sensitive adhesive at its edges. However, as with all methods that use an adhesive for attachment to the painted surface, it must be discarded after a single use.

U.S. Pat. No. 5,702,774, incorporated herein by reference, describes a reusable magnetic masking article that is cut to a particular shape in order to protect a specific feature on a surface to be painted. These articles are designed to protect an interior region having a specific shape when the surrounding areas being painted. The articles, as described, do not provide a means for protecting a peripheral region of arbitrary shape from overspray.

U.S. Pat. No. 5,885,667, incorporated herein by reference, describes the use of an annular magnetic sheet with a fluid impervious sheet bonded to its surface to protect the flanged end of a pipe during transportation and during treatments such as painting. However, the article is specifically designed for annular surfaces and therefore, does not provide a general-purpose masking article or method.

U.S. Pat. No. 6,248,173 and U.S. Pat. No. 5,198,031, both incorporated herein by reference, describe the use of magnetic sheet materials to protectively mask door hinges during painting. In both cases, the magnetic material is cut to match the shape of a door hinge and is, therefore, specific to that application.

Transtech Services, Inc. provides magnetic strips for securing masking materials to automobile surfaces. However, the magnetic strip is not attached to the masking material and must be applied in the same manner as tape. This approach fails to provide an easy method of application.

Mag-Mask International, Inc. sells sets of four magnetic masking shields. The masking shields are large magnetic sheets having holes in the center to define the area to receive paint. Each of the four shields has a different diameter hole. A major disadvantage of this product is limited range of adjustment available for the size and shape of the area to be painted.

SUMMARY OF INVENTION

It is an object of the present invention to provide paint masking articles that may be applied quickly and easily.

It is a further object of the present invention to provide paint masking articles that may be used to define painted areas of various sizes and shapes.

It is also an object of the present invention to provide paint masking articles that are re-useable.

It is a further object of the present invention to provide a paint masking method adapted to the paint masking articles of this invention.

The present invention is, in one aspect, a paint masking article comprising a flexible sheet of paint masking material, a flexible magnetic strip along one edge of the paint masking material and means for securing the magnetic strip to the masking material. In a preferred embodiment the magnetic strip is held within a fold at the edge of the masking material. The means for securing the magnetic strip to the masking material may be stitching, adhesives, or equivalents. Typically, the magnetic strip is about 20% shorter than the edge of the masking material to which it is attached. This provides extra paint masking material at the end of the magnetic strip so that the adjacent paint masking article can overlap, thereby ensuring continuous masking.

The present invention also provides a method for masking surfaces of ferromagnetic articles. Typically, four paint masking articles are applied to a surface to be painted in such a manner as to define a central area where paint is desired the edges of the paint masking articles are overlapped in order to provide continuous protection in peripheral areas where paint is not desired.

DETAILED DESCRIPTION

Figure 1:
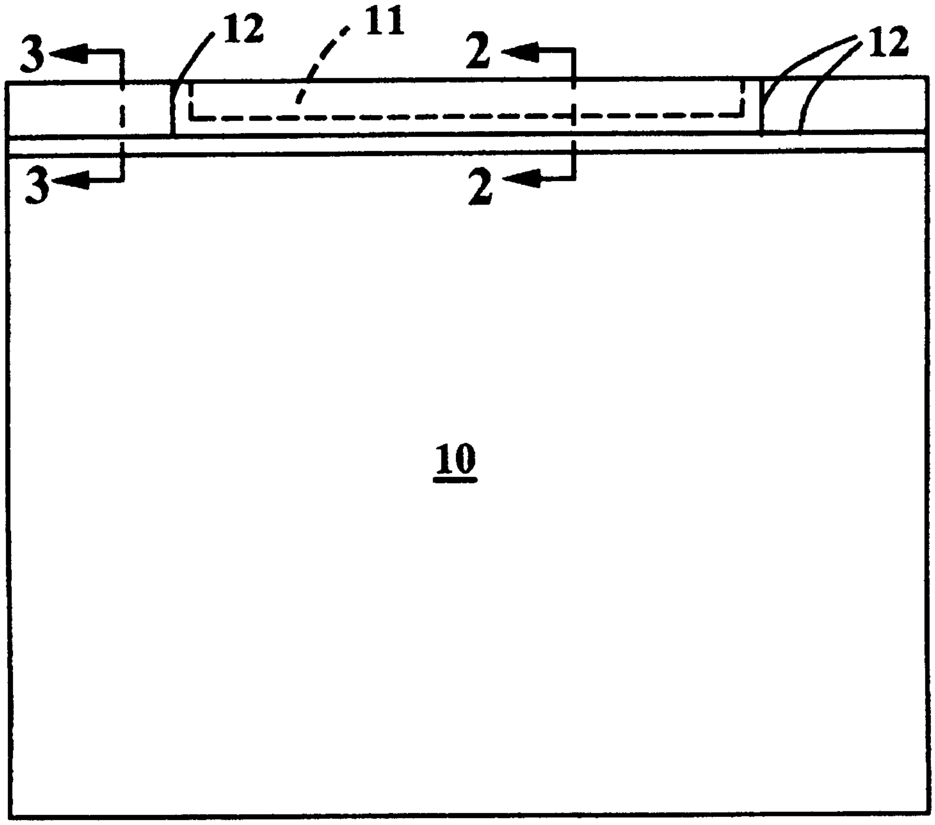
FIG. 1 is a plan view of one embodiment of the paint masking article of the present invention wherein the means for securing the magnetic strip to the paint masking material is stitching.
Figure 2:
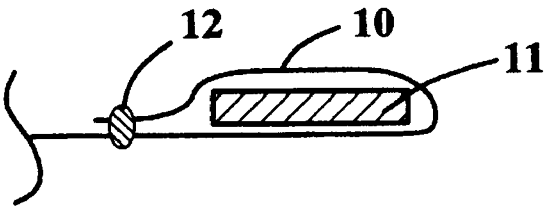
FIG. 2 is a cross-section taken at 2—2 in FIG. 1 showing the magnetic strip secured in a fold of the masking material by stitching.
Figure 3:
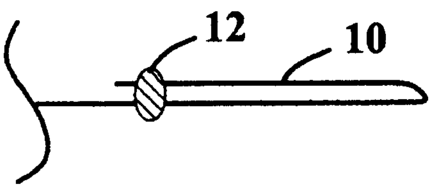
FIG. 3 is a cross-section taken at 3—3 in FIG. 1 showing a stitched fold in the masking material in a region without the magnetic strip.

Referring to FIGS. 1–3, a first embodiment of the paint masking article of this invention comprises a sheet of flexible paint masking material 10 and a flexible magnetic strip 11 wherein the magnetic strip is secured within a fold at the edge of the masking material by means of stitching 12.

The sheet of flexible paint masking material may be natural or synthetic, woven or non-woven, and fibrous or non-fibrous. Paper is an example of a suitable natural, non-woven, fibrous masking material. Although paper is a useable material and is within the scope of the present invention, it is not one of the most preferred materials because it is less durable than other materials when reused. Suitable synthetics include polyolefins. Polyethylene sheeting is an example of a synthetic, non-woven, non-fibrous material that is suitable but not among the most preferred materials. Polyethylene, in this form, is not as flexible and as easily handled as the most preferred materials. A particularly preferred material is the non-woven sheet material comprising high density polyethylene fibers, typified by Tyvek®. It is strong, light, easily handled, and chemically resistant.

A paint masking article for automobile repair work typically utilizes a sheet of paint masking material having a width of about twenty-four inches. However, widths between twelve inches and thirty-six inches may be more suitable for certain repairs. Widths as narrow as two inches and as wide as one hundred inches may also be used. The common lengths of paint masking materials needed for typical repairs includes twenty-four, thirty-six, and forty inches. Lengths in extreme cases may be as short as two inches and as long as one hundred inches. Although lengths greater than one hundred inches may be needed for some applications, the paint masking articles of this invention may be overlapped to extend their effective length to any required extent.

The flexible magnetic strip utilized in the paint masking article of this invention is commercially available from many sources. Transtech Services, Inc. sells magnetic strips that are six feet long and one inch wide. The Magnet Source™ supplies magnetic strips in a variety widths and thicknesses. The strips are supplied on rolls in standard lengths of fifty to two hundred feet. They are also available with an adhesive and a peel-off liner. A variety of rubber-based and acrylic-based adhesives are offered.

The magnetic strip may be cut shorter than the masking material edge to which it is attached. Typically, the length of the magnetic strip is 80–100% of the length of the edge of the masking material. The excess masking material allows for overlap between adjacent masking articles. Since only one of the two overlapping masking articles requires excess masking material, the magnetic strips in some of the masking articles may be the same length as the masking material edge.

The stitching 12 shown in FIGS. 1–3 is preferably machine sewn using methods known in the art. Natural or synthetic thread may be used, with preference being given to a thread type that best matches the paint masking material.

The assembly of the paint article shown in FIGS. 1–3 is accomplished by folding the edge of the paint masking material over the magnetic strip and sewing the stitching as shown.

Figure 4:
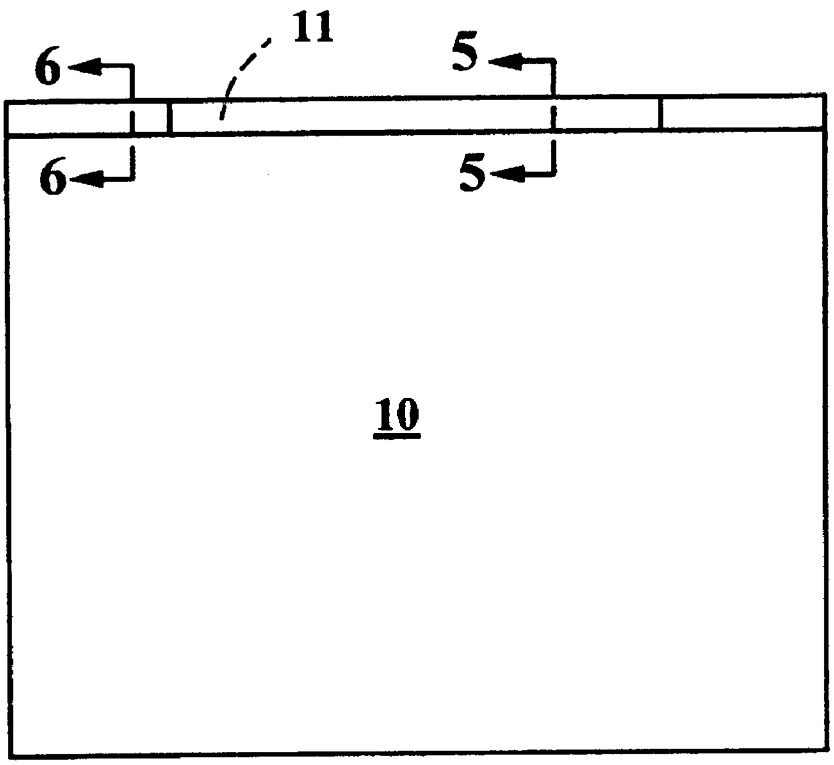
FIG. 4 is a plan view of an embodiment of the paint masking article of this invention wherein the means for securing the magnetic strip to the paint masking material is an adhesive.

Referring to FIGS. 4–6, another embodiment of the paint masking article of this invention comprises a sheet of flexible paint masking material 10 and a flexible magnetic strip 11 wherein the magnetic strip is secured within a fold at the edge of the masking material by means of an adhesive 13.

The paint masking material and the magnetic strip in this embodiment are identical to the corresponding elements in the previous embodiment with the exception of optional adhesive layers with peel-off protective strips.

Figure 5A:
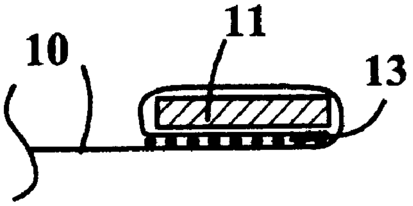
FIG. 5A is a cross-section taken at 5—5 in FIG. 4 showing the magnetic strip secured in a fold of the masking material by means of an adhesive between layers of paint masking material.
Figure 6A:
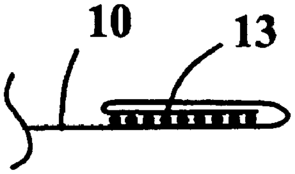
FIG. 6A is a cross-section taken at 6—6 in FIG. 4 showing a fold with adhesive in a region without the magnetic strip.

FIGS. 5A and 6A show cross-sections of the folded edge of the paint masking material when adhesive is used between layers of paint masking material. In this implementation the magnetic strip does not contact the adhesive and may be reused in a new paint masking article after the useful life of the paint masking material. Any of a variety of adhesives known in the art may be applied to the paint masking material at the time that the paint masking article is fabricated. In a preferred embodiment, a pressure sensitive adhesive is applied to an edge of the paint masking material and protected by a peel-off strip. The peel-off strip is removed when the paint making article is assembled.

Figure 5B:
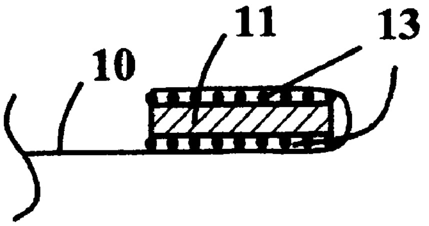
FIG. 5B is a cross-section taken at 5—5 in FIG. 4 showing the magnetic strip secured in a fold of the masking material by means of an adhesive between the paint masking material and the magnetic strip.
Figure 6B:
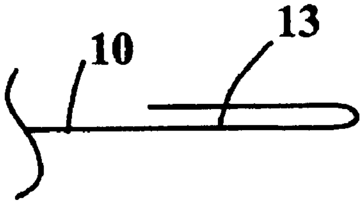
FIG. 6B is a cross-section taken at 6—6 in FIG. 4 showing a fold having no adhesive.

FIGS. 5B and 6B show cross-sections of the folded edge of the paint masking material when adhesive is used between the paint masking material and the magnetic strip. The assembly of this embodiment may be accomplished either by applying adhesive at the time of assembly or by using magnetic strips pre-coated with pressure sensitive adhesive and a peel-off protective sheet.

Figure 7:
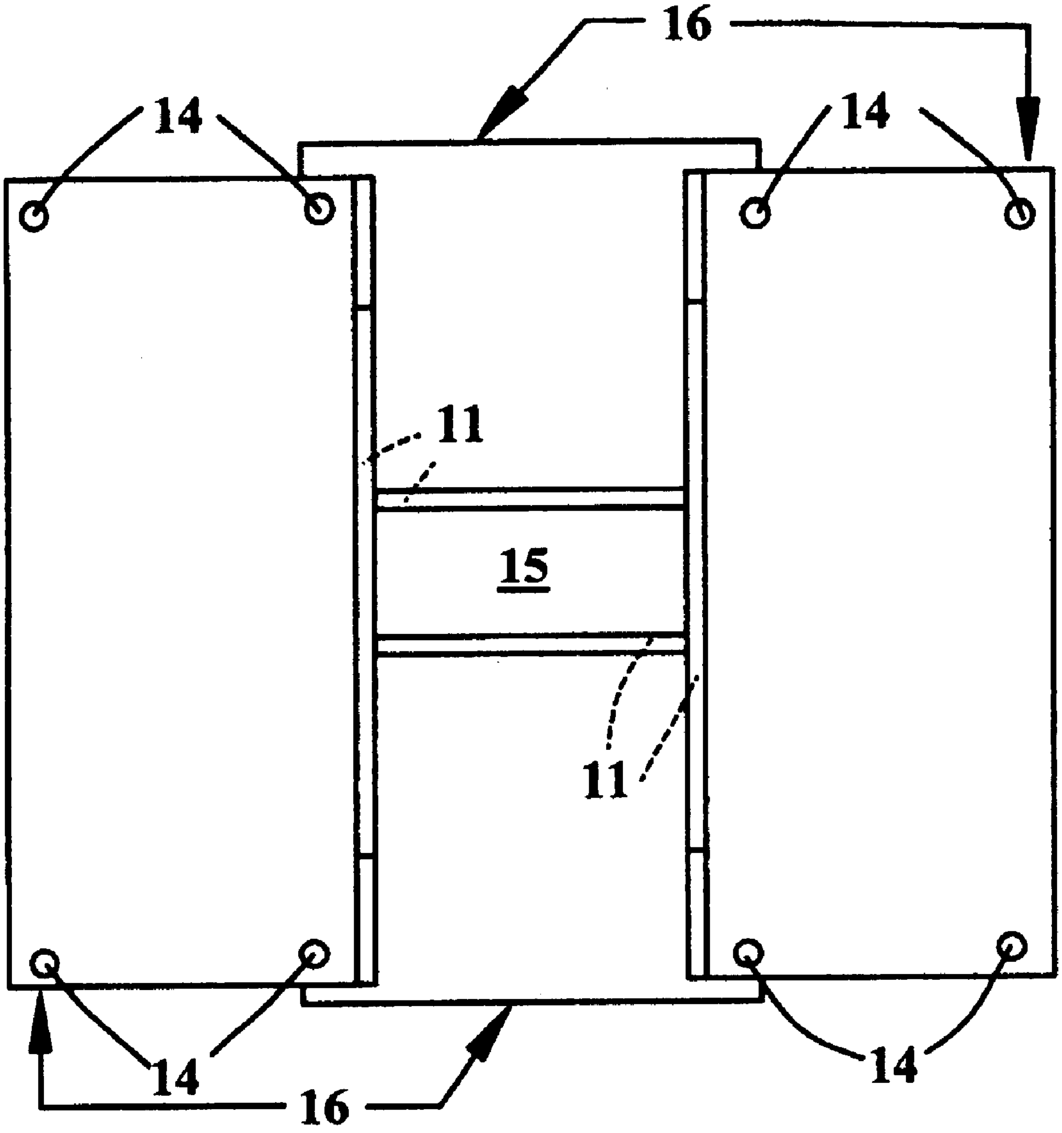
FIG. 7 shows a method of using a plurality of the paint masking articles of the present invention to circumscribe an area to be painted.

FIG. 7 shows how four paint masking articles 16 are used to define an area to receive paint on the surface 15 of a ferromagnetic article. The bottom paint masking article is positioned first, followed by the top paint masking article. Small individual magnets 14 are used to hold the top edge of the paint masking material. The side paint masking articles are then placed so that the paint masking materials overlap, thereby preventing paint from contacting the paint-free areas. The placement of the side paint masking articles is done in a manner that places the magnetic strips 11 of the adjacent paint masking articles in close proximity, thereby ensuring a well defined area to receive paint. Additional small magnets 14 are placed in positions where the paint masking material requires additional support.

Figure 8:
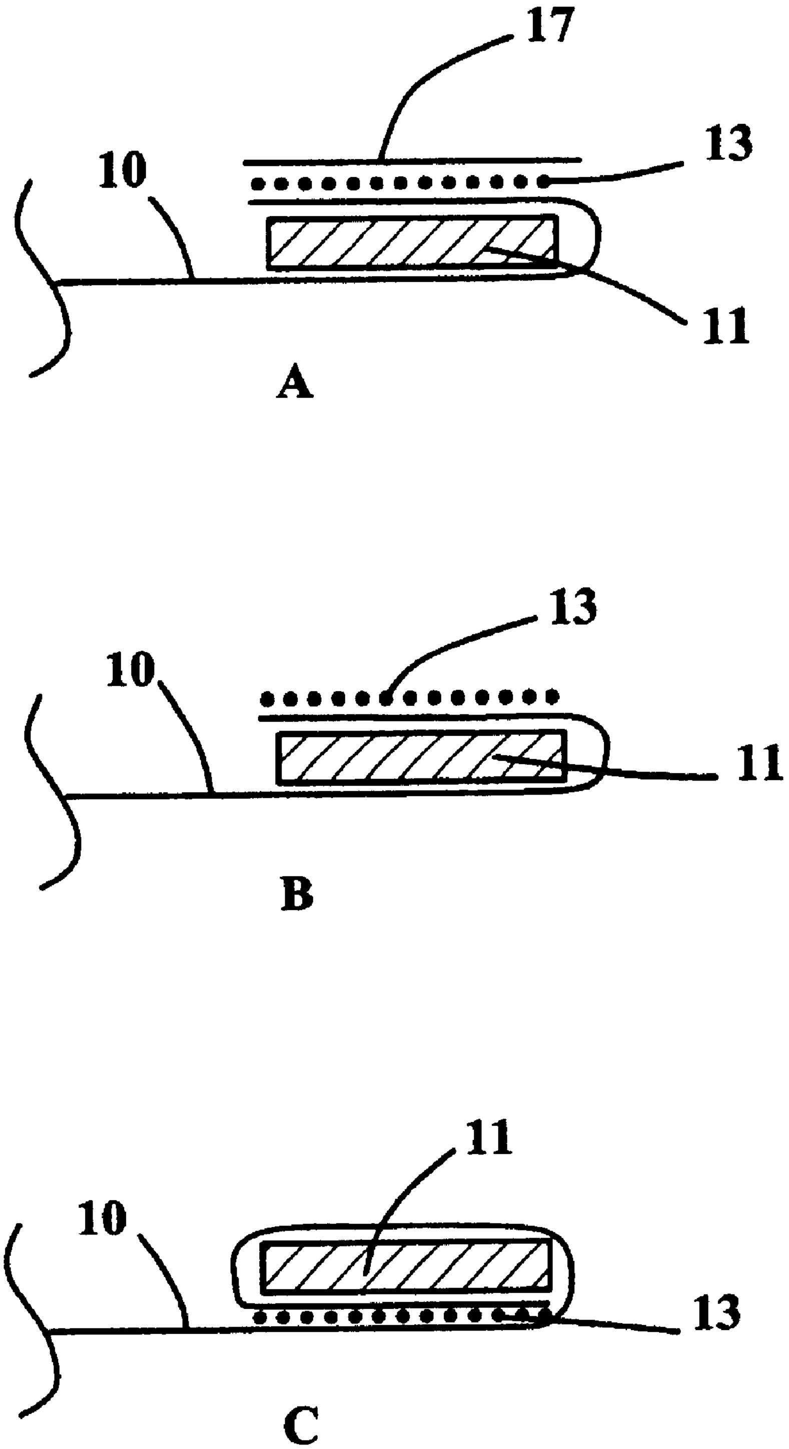
FIG. 8 shows a method of making the embodiment depicted in FIGS. 4, 5A, and 6A using a sheet of paint masking material having pressure sensitive adhesive with a protective strip pre-coated on one edge.

FIG. 8 shows the steps required to assemble a preferred embodiment of the paint masking article of the present invention. A sheet of paint masking material 10 having pressure sensitive adhesive 13 with a peel-off protective strip 17 on one edge is provided. A magnetic strip 11 is also provided. The edge of the paint masking strip having adhesive is folded over the magnetic strip as shown in FIG. 8A. The peel-off protective strip is removed, as shown in FIG. 8B, and the paint masking material with magnetic strip is folded over once more as shown in FIG. 8C. Applying pressure to the pressure sensitive adhesive completes the assembly of a paint masking article such as the one shown in FIGS. 4–6.

What is claimed is:

1. A magnetic paint masking article comprising:

a sheet of flexible paint masking material having a folded back edge, no more than one flexible magnetic strip within said folded back edge, and means for securing said flexible magnetic strip within said folded back edge.

2. The magnetic paint masking article of claim 1 wherein said sheet of flexible paint masking material is substantially rectangular.

3. The magnetic paint masking article of claim 2 wherein said sheet of flexible paint masking material is paper.

4. The magnetic paint masking article of claim 3 wherein said means for securing said flexible magnetic strip within said folded back edge is an adhesive.

5. The magnetic paint masking article of claim 2 wherein said sheet of flexible paint masking material comprises woven natural fibers.

6. The magnetic paint masking article of claim 5 wherein said means for securing said flexible magnetic strip within said folded back edge is stitching.

7. The magnetic paint masking article of claim 5 wherein said means for securing said flexible magnetic strip within said folded back edge is an adhesive.

8. The magnetic paint masking article of claim 2 wherein said sheet of flexible paint masking material is plastic and said means for securing said flexible magnetic strip within said folded back edge is an adhesive.

9. The magnetic paint masking article of claim 2 wherein said sheet of flexible paint masking material is a polyolefin.

10. The magnetic paint masking article of claim 9 wherein said polyolefin is polyethylene.

11. The magnetic paint masking article of claim 10 wherein said polyethylene is in the form of a sheet of bonded fibers.

12. The magnetic paint masking article of claim 11 wherein said means for securing said flexible magnetic strip within said folded back edge is stitching.

13. The magnetic paint masking article of claim 11 wherein said means for securing said flexible magnetic strip within said folded back edge is an adhesive.

14. The magnetic paint masking article of claim 1 wherein the length of said flexible magnetic strip is between 80% and 100% of the length of said folded back edge.

* * * * *